United States Patent [19]

Ollivier et al.

[11] Patent Number: 4,560,613
[45] Date of Patent: Dec. 24, 1985

[54] COMPOSITE MATERIAL

[75] Inventors: Jean-Paul Ollivier, Paris; Bernard Vinatier, Coye La Foret, both of France

[73] Assignee: Atochem, France

[21] Appl. No.: 618,063

[22] Filed: Jun. 7, 1984

[30] Foreign Application Priority Data

Jun. 24, 1983 [FR] France .................. 83 10486

[51] Int. Cl.$^4$ ............... B32B 3/06; B32B 7/10
[52] U.S. Cl. ................ 428/309.9; 428/318.6; 428/318.8; 428/319.3; 428/483
[58] Field of Search .......... 428/71, 309.9, 310.5, 428/313.5, 314.4, 318.8, 319.3, 319.7, 483

[56] References Cited

U.S. PATENT DOCUMENTS

| | | | |
|---|---|---|---|
| 2,959,508 | 11/1960 | Graham et al. | 428/71 |
| 3,229,005 | 1/1966 | Reifenhauser | 428/117 |
| 3,461,496 | 8/1969 | Winstead | 264/48 |
| 3,583,884 | 6/1971 | Baum | 428/314.8 |
| 3,764,642 | 10/1973 | Boutillier | 428/318.8 |
| 3,879,505 | 4/1975 | Boutillier et al. | 264/48 |

FOREIGN PATENT DOCUMENTS

| | | | |
|---|---|---|---|
| 1480638 | 4/1967 | France . | |
| 2034433 | 12/1970 | France | 428/319.7 |
| 912888 | 12/1962 | United Kingdom . | |

*Primary Examiner*—William J. Van Balen
*Attorney, Agent, or Firm*—Sigalos & Levine

[57] ABSTRACT

A homogeneous composite material comprising at least one external layer of thermosetting polymer, a layer of lightened thermoplastic polymer, and intermediate between the two layers, a homogeneous layer formed by polymerizing a monomer which is a diluent for the said lightened polymer; such that the monomer polymerizes to form an intimate blend at the interface of said polymers. The invention also comprises a process for producing the above said composite material.

3 Claims, 1 Drawing Figure

COMPOSITE MATERIAL

BACKGROUND OF THE INVENTION

The present invention relates to novel unitary composite materials comprising a lightened thermoplastic polymer layer, a thermosetting polymer layer, and a homogeneous intermediate layer. The invention also relates to the manufacturing processes.

In contrast to "expanded thermoplastics", which are cellular products of low density, the term "lightened thermoplastic" is used herein to mean the category of cellular products whose mechanical properties are closest to those of the corresponding compact product. The density of the lightened thermoplastics of the invention is greater than 0.15 g/cm$^3$.

Composite materials consisting of expanded materials reinforced with thermosetting polymers are known, but in all cases, when it is technically possible to produce such materials, the resultant composites have a heterogeneous structure. These materials are obtained in two ways: one method involves direct crosslinking of the thermosetting resin on the expanded material, and the other involves adhesion; that is to say, the use of an intermediate adhesive material between the two main constituents.

It is known to use polyester resins for the direct preparation of protective layers on parts made of expanded polystyrene. As indicated in French Pat. No. 1,480,638, this direct crosslinking process has a major disadvantage in that the expanded material is attacked by the customary polyester resins. In fact, the free monomer contained in the thermosetting resin acts as a solvent and attacks the cells of the expanded material, resulting in the destruction of this expanded material and thus preventing the production of an industrially acceptable composite material To overcome this disadvantage, it was proposed in French Pat. No. 1,085,567 to apply to the foams, prior to application of the thermosetting resin, a layer of a substance which firstly does not attack the expanded material and secondly is not attacked by the thermosetting resins. Apart from the fact that this process is rather impractical and slow, the product obtained lacks unity due to the presence of this intermediate foreign substance. This same lack of unity is found again when an adhesive, which is also an intermediate substance, is used to combine an expanded or lightened thermoplastic material with a thermosetting material. This lack of unity leaves the interfaces sensitive to all the phenomena capable of causing separation. It can be said that the use of an intermediate adhesive means makes it possible to obtain *not* a unitary composite, but simply a juxtaposition of plastic elements, the final structure of which is heterogeneous.

Attempts have been made to overcome, at least in part, the disadvantages of the previous techniques in French Pat. No. 1,480,638. According to the said patent, a polyester resin is polymerized directly on an expanded polystyrene material after the major part of the monomer which is a solvent for the polystyrene, contained in the polyester, has been replaced with an N-methylolurea allyl ether which is a non-solvent for the polystyrene. But here again, only a non-unitary and hence heterogeneous composite can be obtained; it only being possible for the bonding between the two components to be mechanical. In fact, since the polyester resin no longer possesses a means of acting directly on the polystyrene itself, it can only infiltrate and crosslink in the pores of the expanded material, thereby causing only mechanical attachment without intimate bonding, which results in the production of a product having limited mechanical properties.

SUMMARY OF THE INVENTION

In contrast to the known products, the present invention relates to a new, truly unitary, composite material of homogeneous structure at the interface of the layers thereof; the layers thus being intimately joined to one another.

Briefly stated, the present invention is directed to a composite material comprising at least one external layer of a thermosetting polymer, a layer of a lightened thermoplastic polymer, and a homogeneous interface between said layers formed by a polymerized monomer which is a diluent for the thermosetting polymer and a solvent for the lightened thermoplastic polymer, which monomer, during cross-linking of the thermosetting polymer in forming the composite, polymerizes to produce an intimate blend of the polymerized monomer, cross-linked thermosetting polymer, and lightened thermoplastic polymer over the entire interface of the two layers.

The invention also comprises the method of making such composite as set forth below.

DETAILED DESCRIPTION

Figure 1:
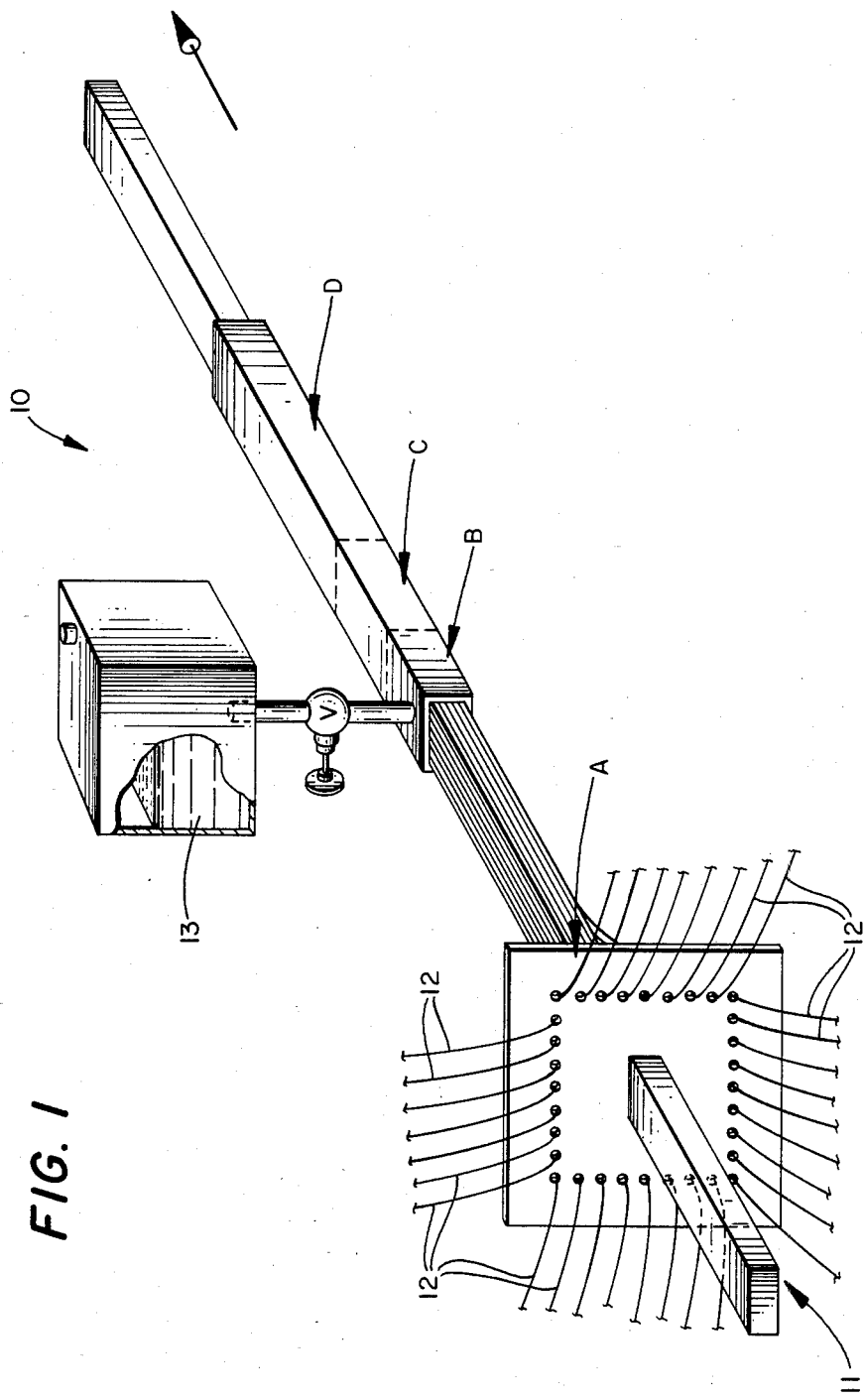
FIG. 1 is a perspective view; partly in section, of an apparatus system for carrying out the continuous process of the present invention.

The interface between thermosetting polymer and thermoplastic lightened polymer is in the form of an alloy or amalgam, such as can be found, for example, after mixing compatible materials in the molten state. This form of bonding at the interface of the components makes it possible to pronounce the composite material "unitary" and of homogeneous structure, in contrast to a so-called composite material of heterogeneous structure, which can be obtained, for example, by gluing; in which case the interfaces do not have a transition region and are very pronounced and vulnerable to separation.

A composite material of the present invention, which could not be obtained before because of the destruction of the expanded or lightened base material by the solvent monomer, can now be produced by virtue of the structure of the surface to be combined of this expanded material, compared with the core. According to the invention, the substance constituting the surface to be combined of the expanded material must have a density similar to that of the base composition used to manufacture the said lightened material. This means that, in the extreme case, the external surface to be combined can be substantially in a non-lightened form, the core of the material being lightened. Lightened materials of this type are known and are sometimes referred to as having a smooth surface or a skin. That is to say, they possess on their surface a relatively dense layer, according to the definition of the word "skin" given in "Standard Definitions of Terms Relating to Plastics" ASTM D 883, compared with the lightened materials whose surface density is substantially identical to that of the core. They are usually obtained by vigorously cooling the surface which it is desired to keep dense, at the moment of expansion, in order to give it a smooth appearance.

The techniques for obtaining these materials are widely described, in particular, in British Pat. No. 912,888 and U.S. Pat. Nos. 3,461,496, 3,764,642, and 3,879,505. They can also be obtained by the coextrusion of a dense thermoplastic used as a surface layer, and the same lightened thermoplastic as described in U.S. Pat. No. 3,229,005. The density of the external surface of such products is commonly between 80 and 100% of that of the base composition used to manufacture this external surface. The expression "density of the base composition" is understood as meaning not only the density of the thermoplastic polymer in the non-lightened state when the latter is used in the pure state as the raw material for the manufacture of the lightened material of the composite, but also the density of the non-lightened material obtained from a thermoplastic polymer containing conventional fillers and used as the raw material for the manufacture of the lightened material of the composite.

The essential requirement for obtaining the composite according to the invention is the combination of: a monomer which is a solvent for the lightened thermoplastic polymer, and densification of the surface to be combined of the said lightened polymer. The thickness of the densified surface only has a secondary role. It must preferably be as thin as possible so as to keep the maximum amount of cellular material and to keep it as far as possible from the central axis of the lightened material. In practice, the thickness must be sufficient to permit the diffusion of the solvent monomer at the surface of the lightened polymer without allowing it to reach the lightest parts, which would result in destruction of the cellular core. It is easy for those skilled in the art to adapt the most appropriate thickness of the surface in question, in particular, as a function of the lightened thermoplastic polymer, the solvent monomer and its polymerization rate.

The thermoplastic polymers suitable for the invention are those which are capable of being lightened by the known means and techniques. By way of example, the thermoplastic product can be chosen from the group comprising polystyrene, polyvinyl chloride, polyvinyl acetate, acrylonitrile/butadiene/styrene copolymers, polycarbonates, styrene/acrylonitrile or acrylonitrile/butadiene/α-methylstyrene copolymers, polymethyl methacrylate, polyphenylene oxide, cellulose acetate, acetobutyrate and propionate, and mixtures thereof.

All the known unsaturated polyester resins are suitable as the thermosetting polymer for producing the composite. In general, these are polycondensates prepared by reacting an unsaturated diacid or anhydride, for example, maleic acid or anhydride, fumaric acid, hexachloroendomethylenetetrahydrophthalic acid and the like, with a diol, and more frequently by conjointly reacting an unsaturated diacid or anhydride and a saturated diacid or anhydride, for example, phthalic acid or anhydride, isophthalic acid, terephthalic acid, adipic acid, tetrabromophthalic acid and the like, with a diol or a mixture of diols. The molar ratio of unsaturated diacid to saturated diacid in these polycondensates is always greater than zero. By way of example, the diols used to prepare these polycondensates can be propylene glycol, ethylene glycol, diethylene glycol, butylene glycol, pentanediol, heptanediol, and the like, and also halogenated diols such as the diols derived from decachlorodiphenyl. These lists of acids and diols are given by way of examples and are not intended to be a limitation of the invention.

The reaction is carried out by the known methods, in the presence of absence of a catalyst, until the desired degree of condensation is reached. Vinyl ester resins which are condensation products of epoxy resins with unsaturated monocarboxylic acids, for example, the products obtained by reacting bisphenol A glycidyl ether with acrylic or methacrylic acid, can also be used as the thermosetting polymer. The polycondensates obtained are then dissolved in an ethylenically unsaturated monomer which can be used in the manufacture of unsaturated polyester resins. This unsaturated monomer is used to bridge the polyester chains to one another during crosslinking. This monomer must also be a solvent for the lightened thermoplastic polymer. This property enables it to diffuse into the dense surface of the lightened material and, during the crosslinking of the polyester resin, to polymerize inside the partially dissolved, lightened material, thus forming an intimate blend at the interface between thermosetting polymer and thermoplastic polymer. The monomer which can be used as a diluent for the thermosetting resin and as a solvent for the thermoplastic resin is known and is usually chosen from the group comprising styrene compounds such as styrene, methylstyrene, chlorostyrene, tert.-butylstyrene and vinyltoluene, acrylic and methacrylic acid monoesters or diesters such as methyl methacrylate and butane-1,3-diol dimethacrylate, allyl esters such as diallyl phthalate, and vinyl esters such as vinyl acetate and vinyl propionate.

Of course, the monomer is chosen as a function of its properties as a solvent for the thermoplastic polymer. For example, if the lightened material is a styrene polymer, the chosen monomer is preferably a styrene compound such as styrene, by itself or in a mixture. Alternatively, in the case of polyvinyl chloride, it is preferred to choose methyl methacrylate, by itself or in a mixture.

The usual adjuvants can be added to the polyester resins, for example, diluting and/or reinforcing fillers such as fibrous materials, shrinkage inhibitors such as thermoplastic resins dissolved in the monomer, or fireproofing agents.

The composite material can be manufactured by any of the known processes making it possible to produce a composite material of any kind. For example, it is possible to apply a thermosetting resin, diluted, of course, with the solvent monomer, to a lightened thermoplastic having a dense surface, and to crosslink. It can also be manufactured by hot compression of a prepreg on the thermoplastic material, where a sheet molding compound prepreg is defined as a polyester resin having a fibre filler and treated with a thickener such as an alkaline earth metal oxide.

The present invention also comprises a process for continuously producing the composite material of the invention. A continuous production of a composite material of lightened thermoplastic polymer and thermosetting polymer is not known in the prior art.

FIG. 1 illustrates this process and apparatus therefor. The lightened thermoplastic profile (11) whose external surface consists of a relatively dense layer is guided into the die (10) by means of a centering plate A, while simultaneously being coated with continuous glass fibers (12). The polyester feed system (B), by which the polyester composition containing the monomer and the thermosetting resin (13) is fed onto the fiber-coated profile, has a length of 80 mm and is located at the front of the die (10). The profile (11) is then heated to a temperature of between 100° and 200° C. while passing through two heating zones, A of length 400 mm, and B of length 600 mm.

After the final shaping and crosslinking of the thermosetting resin in the die, the composite material is recovered at the outlet of the die.

As is known, the die is a device of tubular shape, the geometry of which corresponds substantially to that of the composite material which it is desired to obtain. The heating devices are arranged on the die so that it is possible to vary the temperature over several zones. These temperature zones, which are chosen between 100° and 200° C., are regulated as a function of the various other parameters such as: the crosslinking rate of the thermosetting resin, the length of the die, and the drawing speed of the composite.

In a preferred embodiment of the invention, it seems that a die length of 0.5 m to 1.50 m makes it possible to obtain industrially suitable drawing speeds of about 0.5 m to 3 m/minute.

The fibers used in the process are in a continuous form, which means that they possess a continual link between the inlet and the outlet of the die. For example, these fibers can be in the form of threads or rovings, a fabric or a mat consisting of a web of non-woven cut fibers. The fibers which are preferred for the invention are glass, carbon, or aramide fibers. The impregnation of the fibers with thermosetting resins at the die inlet is carried out by any known means. It can be carried out, for example, by bathing or dipping the fibers before they enter the die; or, alternatively, by means of a flow device for thermosetting resin, such as an injection chamber, located in a cold zone preceding the heated zone or zones of the die.

At the time of impregnation, the thermosetting resin contains all the usual adjuvants such as fillers, pigments, shrinkage inhibitors and, in particular, the catalyst system which causes the crosslinking; and, also, if appropriate, a mold release agent.

In the process described, it is possible not only to prepare long composites from lightened thermoplastic profiles prepared before hand, but also to manufacture composites in a totally continuous manner by placing the die and the fiber impregnation device at the outlet of the extrusion line for the lightened thermoplastic profile. In this case, it is only necessary to modify the various parameters, by means of routine tests, in order to coordinate the two techniques. The fact that the composite is obtained by the process of the invention seems all the more surprising because, despite the temperature of the die, which is above the sofetning point of the lightened thermoplastic meterial and is of the order of 80° C., no deformation of the core is observed at the die outlet.

The invention will be further described in connection with the following examples which are set forth for purposes of illustration and comparison only.

EXAMPLE 1

A lightened polystyrene plate of density 0.25 g cm$^3$, the two larger external faces of which have a density of the order of 0.9 g/cm$^3$, and which has a thickness of 10 mm and a length×width of 398×298 mm, is taken as the core of the composite material.

A moldable prepreg of the following composition is also prepared:

|  | Parts by Weight |
|---|---|
| Propylene glycol maleate and dipropylene glycol maleate diluted to 68% in styrene | 100 |
| Calcium carbonate | 100 |
| Shrinkage inhibitor (28% solution of polystyrene in styrene) | 65 |
| Calcined kaolin | 50 |
| Tertiary butyl peroctoate | 1.5 |
| Zinc stearate | 7 |
| Magnesia | 1.5 |
| Chopped glass fibers (1 = 25 mm) | 110 |

A layer of prepreg of 250×150 mm and of about 2.5 mm is applied to each of the two larger faces of the polystyrene plate. The thus layered plate is then placed in a 300×400 mm mold heated to 115° C. The mold is closed and the pressure is allowed to rise to 10 bars and then released immediately. After three minutes, the mold is opened and a perfectly homogeneous composite is recovered which does not show any penetration of thermosetting resin into the cellular material.

The total thickness of the final composite is 11.3 mm with two surface layers of reinforced polyester, also including the interfacial alloy, of 1 mm each. The apparent reduction in the polystyrene core has only been 0.7 mm.

The mechanical properties measured on the composite are as follows:

| Density | 0.5 g/cm$^3$ |
|---|---|
| Flexural modulus (according) to ISO Standard R179) | 3,500 MPa |
| Stiffness | 8,463,306 N × mm$^2$ |
| (Calculated according to ALLEN "Analysis and Design of Structural Sandwich Panels", Pergamon, Oxford 1969, for a 15 mm wide test piece) | |
| stiffness measured | 6,370,500 N × mm$^2$ |

EXAMPLE 2

(COMPARATIVE)

The plate of Example 1 is used again after the parts of approximate density 0.9 g/cm$^3$ have been sawn off. The thickness of this plate is now only 6.5 mm.

After it has been treated under the conditions of Example 1, a material imperfectly covered with polyester is finally obtained. The covered parts have a coating with a non-uniform thickness of between 1 and 2.5 mm. The penetration of polyester into the cellular core is observed, the thickness of the core changing from 6.5 mm to 3 mm in places.

This material is unusable.

EXAMPLE 3

A lightened thermoplastic profile of cross-section 28 mm×10.6 mm, with an external skin, is produced continuously, in accordance with the technique described in French Pat. No. 1,498,620, by extruding a mixture containing:

|  | Parts by Weight |
|---|---|
| Crystal polystyrene beads (weight-average molecular | 100 |

| | Parts by Weight |
|---|---|
| weight 375,000) | |
| White mineral oil | 0.05 |
| Sodium bicarbonate | 5 |
| Stearic acid | 0.1 |

This expandable plastic composition is introduced into an extruder of diameter 40 mm and length 800 mm, equipped with a screw having a compression ratio of 2.5:1, and is forced by the said screw through a die having a cross-section substantially identical to that of the profile to be obtained, in which there is a mandrel rod capable of creating an internal hollow space in the extruded substance, and, adjacent to the outlet of the said die and substantially coaxial with the latter, a shaper consisting of a 1 m long channel open at both ends and having an inlet cross-section similar to that of the die and an outlet cross-section identical to that of the profile to be obtained (28×10.6 mm).

The extrusion conditions are as follows:

| | |
|---|---|
| Extruder temperatures | 140–160–170° C. |
| Die temperature | 165° C. |
| Shaper temperature | 40° C. |
| Linear exit speed of the profile | about 1 m/minute |
| Overall density of the profile | about 0.47 g/cm³ |
| Density of the skin | about 0.95 g/cm³ |

Placed behind the line of extrusion of the profile (11) is the die (10), shown in the attached diagram, of dimensions 30.2×12.6 mm and possessing two heating zones: C, of length 400 mm, at 100° C., and D, of length 600 mm, at 130° C.

Placed in front of this die (10), in contact with it and of the same geometry, is the polyester feed system (B) by which the polyester composition (13) is fed onto the fiber-coated profile. This system (B), which has a length of 80 mm, is kept at 30° C.

At the extruder outlet, the profile (11) is guided into the die (10) by means of a centering plate A, while being simultaneously coated with continuous glass fibers (12) also called rovings (RO 99 P 103 from VETROTEX). There are 38 rovings (12).

As the assembly of profile and rovings enters B, a polyester composition (13) of the following formulation is injected onto the fibers:

| | Parts by Weight |
|---|---|
| 68% solution of propylene glycol maleate and dipropylene glycol maleate in styrene | 50 |
| Maleophthalate resin | 50 |
| Mold release agent (ORTHOLEUM 162) | 0.5 |
| Tertiary butyl peroctoate | 1.5 |

The maleophthalate resin consists of a mixture of:

| | Parts by Weight |
|---|---|
| Propylene glycol maleophthalate | 44 |
| Shrinkage inhibitor (polyvinyl acetate) | 12 |
| Styrene | 44 |

The final composite material is drawn at the die outlet by means of a caterpillar pull-off.

A homogeneous composite material is obtained, the lightened core of which has not been deformed; the bonding between the polyester and the polystyrene is perfectly executed without penetration of the polyester into the cellular core. The thickness of the polyester surface is 1 mm and the proportion of glass by weight, relative to the polyester, is 62%.

The mechanical properties of the material obtained are as follows:

| | |
|---|---|
| Density: | 0.62 g/cm³ |
| Flexural modulus: | 8030 MPa |
| Stiffness: | 69,298,256 N × mm² |

If, by way of comparison, a profile whose external surface has a density identical to that of the core is passed through the die under the above conditions, the section of the composite obtained reveals collapsing of the foam and penetration of the polyester resin into the cellular core. This type of material is completely unusable.

EXAMPLE 4

The procedure is the same as in Example 3, but the following resinous composition is injected onto the fibers:

| | Parts by Weight |
|---|---|
| 60% solution of dipropylene glycol maleate and propylene glycol maleate in styrene | 100 |
| Mold release agent (ORTHOLEUM 162) | 0.5 |
| Tertiary butyl peroctoate | 1.5 |

A homogeneous composite material is obtained continuously, the core of which has not been deformed and in which, as in Example 3, the polystyrene/polyester bonding is perfect.

However, in this case, it is observed that the external surface appearance of the thermosetting resin is less smooth and less attractive than in Example 3.

EXAMPLE 5

A lightened thermoplastic profile of cross-section 28×10.6 mm, with an external skin, is produced continuously in the same manner as in Example 3, but this time the composition extruded is:

| | Parts by Weight |
|---|---|
| Kwert 55 PVC | 100 |
| High molecular weight SAN copolymer | 8 |
| Calcium stearate | 1.2 |
| Polyethylene wax | 0.5 |
| Barium/cadmium laurate | 2 |
| Organic phosphite | 0.5 |
| Sodium bicarbonate | 2 |
| Extruder temperature | 160 to 180° C. |
| Die temperature | 180° C. |
| Shaper temperature | 30° C. |
| Approximate linear exit speed of the profile | 0.8 m/mm |
| Approximate overall density | 0.5 |
| Approximate density of the skin | 1.3 |

The procedure is thereafter the same as in Example 3, the resinous composition injected onto the fibers being as follows:

|  | Parts by Weight |
|---|---|
| 60% solution of propylene glycol maleoisophthalate and neopentylglycol maleoisophthalate in a styrene/methyl methacrylate mixture (methyl methacrylate: 10 - styrene:30) | 100 |
| Mold release agent (ORTHOLEUM 162) | 0.4 |
| Tertiary butyl peroctoate | 1.2 |

The die temperatures are:

A, of length 400 mm, at 100° C., and

B, of length 600 mm, at 110° C.

There are also 38 rovings.

The material is drawn continuously by the caterpillar pull-off at a speed of 1 m/minute.

As in the previous case, the bonding between the polyvinyl chloride and the polyester is executed perfectly.

The thickness of the polyester surface is 1 mm and the proportion of glass by weight, relative to the polyester, is 62%.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined in the appended claims.

What is claimed is:

1. A composite material comprising at least one external layer of a thermosetting polymer, a layer of lightened thermoplastic polymer, and a intermediate layered blend between and homogeneous with said layers over the entire interface of said layers; said intermediate layered blend formed by polymerizing a monomer which is a diluent for said thermosetting polymer and a solvent for said thermoplastic polymer as the external thermosetting polymer is being cross-linked to form the composite.

2. The composite material of claim 1 wherein the surface of the lightened thermoplastic polymer layer to be combined with the thermosetting polymer has a density higher than the core thereof.

3. The composite material of claim 1 or 2 wherein the thermosetting polymer layer contains a fibrous filler.

* * * * *